United States Patent
Moreno et al.

(10) Patent No.: US 9,240,944 B2
(45) Date of Patent: Jan. 19, 2016

(54) OVERLAY SERVICES IN COMMUNICATION NETWORKS

(71) Applicant: CISCO TECHNOLOGY, INC., San Jose, CA (US)

(72) Inventors: Victor Moreno, Carlsbad, CA (US); Dino Farinacci, San Jose, CA (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 13/751,717

(22) Filed: Jan. 28, 2013

(65) Prior Publication Data

US 2014/0112349 A1 Apr. 24, 2014

Related U.S. Application Data

(60) Provisional application No. 61/716,284, filed on Oct. 19, 2012.

(51) Int. Cl.
| | |
|---|---|
| *H04L 12/56* | (2006.01) |
| *H04L 12/715* | (2013.01) |
| *H04L 29/12* | (2006.01) |
| *H04L 12/46* | (2006.01) |
| *H04L 12/64* | (2006.01) |

(52) U.S. Cl.
CPC ............ *H04L 45/64* (2013.01); *H04L 12/4633* (2013.01); *H04L 12/4641* (2013.01); *H04L 12/6418* (2013.01); *H04L 61/103* (2013.01)

(58) Field of Classification Search
CPC ...................................................... H04L 45/00
See application file for complete search history.

(56) References Cited

U.S. PATENT DOCUMENTS

| 8,166,205 | B2 | 4/2012 | Farinacci et al. | |
|---|---|---|---|---|
| 2006/0166699 | A1* | 7/2006 | Aghvami et al. | 455/552.1 |
| 2009/0037607 | A1* | 2/2009 | Farinacci et al. | 709/249 |
| 2011/0317703 | A1* | 12/2011 | Dunbar et al. | 370/392 |
| 2012/0176934 | A1 | 7/2012 | Farinacci et al. | |
| 2013/0322237 | A1* | 12/2013 | DeCusatis et al. | 370/230 |

OTHER PUBLICATIONS

IETF RFC 3931, "Layer Two Tunneling Protocol—Version 3 (L2TPv3)", J. Lau, Ed., Mar. 2005.
IETF RFC 2784, "Generic Routing Encapsulation (GRE)", D. Farinacci, Mar. 2000.
Maino V Ermagan, D Farinacci, M Smith."LISP Control Plane for Network Virtualization Overlays;draft-maino-nvo3-lisp-cp-01.txt" IETF, Sep. 20, 2012, pp. 1-19.
Fuller D Farinacci."LISP Map Server Interface;draft-ietf-lisp-ms-14. txt"IETF, Dec. 17, 2011, pp. 1-16.

* cited by examiner

*Primary Examiner* — Samina Choudhry
(74) *Attorney, Agent, or Firm* — Cindy Kaplan (57) ABSTRACT

In one embodiment, a method includes receiving a packet from a first host at a first edge device, the packet comprising a layer 3 address of a second host in communication with a second edge device, using the layer 3 address of the second host to receive a layer 2 address and a location identifier for the second host from a database accessible from a core network, the database comprising a mapping of layer 3 host addresses to layer 2 host addresses and location identifiers, and storing a mapping of the layer 2 address to the location identifier at the first edge device for use in forwarding packets to the second host. The first edge device is in communication with the second edge device in an overlay network defined by the edge devices interconnected by the core network. An apparatus and logic are also disclosed herein.

20 Claims, 5 Drawing Sheets

OVERLAY MAPPING TABLE ⌐30

| HOST LAYER 2 ADDRESS | LOCATION IDENTIFIER (OVERLAY ADDRESS) |
|---|---|
| MAC HB | IP EDB |
| . | . |
| . | . |

FIGURE 3A

DATABASE NODE MAPPING TABLE ⌐34

| HOST LAYER 3 ADDRESS | HOST LAYER 2 ADDRESS & LOCATION IDENTIFIER |
|---|---|
| IP HB | MAC HB & IP EDB |
| . | . |
| . | . |

OVERLAY SERVICES IN COMMUNICATION NETWORKS

STATEMENT OF RELATED APPLICATION

The present application claims priority from U.S. Provisional Application No. 61/716,284, entitled OVERLAY SERVICES IN COMMUNICATION NETWORKS, filed on Oct. 19, 2012. The contents of this provisional application are incorporated herein by reference in its entirety.

TECHNICAL FIELD

The present disclosure relates generally to communication networks, and more particularly, to overlay services.

BACKGROUND

Overlay technologies, including layer 2 and layer 3 overlay services, are needed for many applications in communication networks.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving a packet from a first host at a first edge device, the packet comprising a layer 3 address of a second host in communication with a second edge device, using the layer 3 address of the second host to receive a layer 2 address and a location identifier for the second host from a database accessible from a core network, the database comprising a mapping of layer 3 host addresses to layer 2 host addresses and location identifiers, and storing a mapping of the layer 2 address to the location identifier at the first edge device for use in forwarding packets to the second host. The first edge device is in communication with the second edge device in an overlay network defined by the edge devices interconnected by the core network.

In another embodiment, an apparatus generally comprises memory for storing a database comprising a plurality of entries each comprising a layer 3 address mapped to a layer 2 address and a location identifier, a processor for receiving a host layer 3 address and searching the database for a layer 2 address and location identifier for the host, transmitting the layer 2 address and the location identifier to an edge device located in an overlay network defined by a plurality of edge devices interconnected by a core network, and an interface for communication with the core network. The layer 3 address is used in a control plane to search the database, and a mapping of the layer 2 address to the location identifier is used in a data plane.

In yet another embodiment, logic is encoded on one or more tangible computer readable media for execution and when executed operable to receive a packet comprising a layer 3 header containing information for source and destination endpoints, insert an overlay field and a layer 3 outer header at an edge device, and transmit the packet from the edge device on a layer 3 overlay defined by a plurality of edge devices interconnected by a core network. The packet transmitted from the edge device includes a layer 2 inner header.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Overlay Network

Overlay Transport Virtualization (OTV) is an example of a method for providing overlay services. OTV may be used, for example, to support layer 2 (L2) and layer 3 (L3) virtual private networks (VPNs) over a L2 or L3 infrastructure. OTV operates at edge devices located at the network sites to create an overlay network. Layer 2 Ethernet overlay services are needed in many applications. The MAC (Media Access Control) address family used at layer 2 is a flat address space that cannot be summarized. This lack of aggregability in the MAC address space is an ongoing challenge in providing scalable L2 overlay services. A first embodiment (referred to below as scalable layer 2 overlay services) brings the scale benefits of address space aggregability to L2 overlay solutions.

The first embodiment improves control plane scalability of layer 2 overlays. The embodiment may be used in a layer 3 control plane to provide a scalable layer 2 overlay service. As described below, a database is used that handles both the L2 and L3 addresses of the hosts. The L3 information is used to give the database aggregability and hierarchy and as the lookup key to find the mappings for the L2 addresses. The embodiment improves L2 overlay implementations on hardware that is not capable of realizing L3 lookups in order to provide a full L2 overlay. This brings some of the scale benefits of an L3 overlay to an L2 overlay. The scalability improvement of the control plane is significant in contrast with the approach of handling the MAC address family natively.

The focus on overlay technologies has been mainly on L2 overlays, but there is also a need for L3 overlays. As the overlay landscape evolves and the industry embraces overlay models, there may be a hardware support gap for L3 overlay data planes. A second embodiment (referred to below as consolidation of data plane encapsulation in L2 and L3 overlays) allows for the use of an L2 overlay data plane format to implement an L3 overlay.

The second embodiment provides a data plane encapsulation that can be used to deliver both L2 and L3 overlay services. For the L3 overlay case, the fields used for the L2 inner header are preserved, but ignored during the forwarding process. This allows for the use of common hardware and standard encapsulations to deliver L2 and L3 overlay services.

Figure 1:
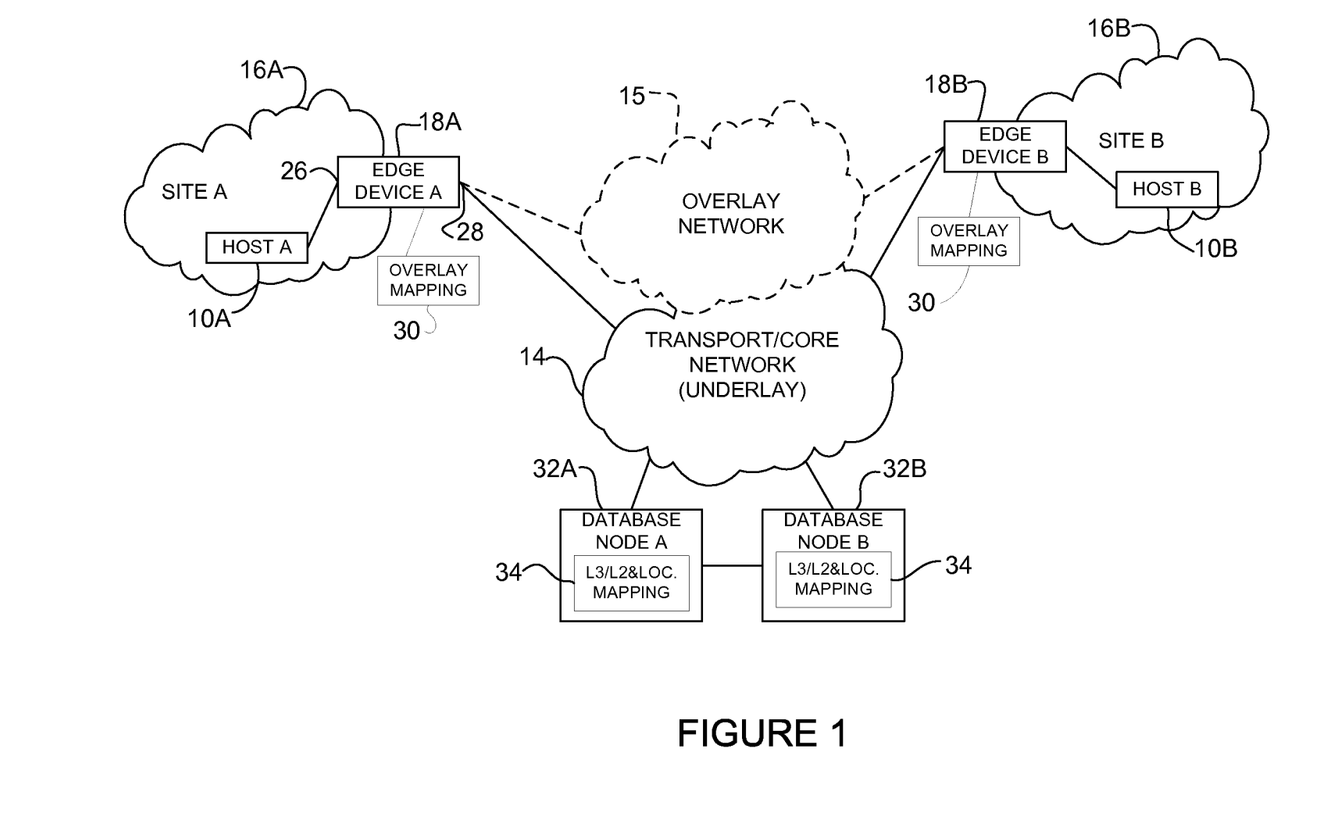
FIG. 1 illustrates an example of a network in which embodiments described herein may be implemented.

Referring now to the drawings, and first to FIG. 1, an example of a network in which embodiments described herein may be implemented is shown. For simplification, only a small number of nodes are shown. In the example shown in FIG. 1, two servers (hosts, endpoints, physical machines) 10A, 10B are in communication over network sites 16A and 16B, and transport network (core network, backbone) 14. The network sites 16A, 16B may belong to a virtual private network (VPN), which may include any number of network sites. The networks 16A, 16B may be configured for use as a data center or any other type of network. The transport network 14 may be, for example, an L3 IP (Internet Protocol) network core, L2 metro Ethernet core, MPLS core, or any other type of network. The transport network 14 may also be referred to as an underlay network.

In the example shown in FIG. 1, each network site 16A, 16B includes an edge device 18A, 18B, respectively. In one embodiment, the edge devices 18A, 18B are configured to run OTV, which defines an overlay network 15 coupled to each edge device. The network sites 16A, 16B are connected together via the edge devices 18A, 18B that operate in the overlay network 15 and provide L2 and L3 connectivity among the sites. OTV may be used, for example, to map MAC address destinations to IP next hops that are reachable through the transport network 14. Traffic destined for a particular MAC address is encapsulated in IP and carried through the IP network to its MAC address routing next hop. The overlay mappings are maintained in overlay mapping table 30 described below with respect to FIG. 3A. OTV is independent of the technology deployed in the core network 14.

The edge devices 18A, 18B in the OTV network perform L2 learning and forwarding on site-facing interfaces (internal interface 26) and IP-based virtualization on transport-facing interface (overlay interface 28). The dual functionality of the edge device provides the ability to connect L2 networks, L3 networks, or hybrid (L2 and L3) networks together. The edge devices 18A, 18B are configured to perform encapsulation and decapsulation as described further below. In one example, OTV operates as described in U.S. Pat. No. 8,166,205, issued Apr. 24, 2012, which is incorporated herein by reference in its entirety.

Each network 14, 16A, 16B may include any number of edge devices or intermediate (core) nodes (e.g., routers, switches, access layer devices, aggregation layer devices, or other network devices), which facilitate passage of data within the network. Also, each edge device 18A, 18B may be in communication with any number of hosts at each network site 16A, 16B and may operate in more than one overlay network 15.

The edge devices 18A, 18B may be switches, routers, or other network devices configured to perform forwarding functions (e.g., L2, L3, or L2/L3 devices). The edge device may be, for example, a NEXUS series switch available from Cisco Systems, Inc. of San Jose, Calif. It is to be understood that this is only an example of a network device that may be used to implement the embodiments described herein. For example, the edge device may also be a softswitch located at the host, rather than the physical network device. In one example, the edge device may be implemented as a softswitch in the host hypervisor.

The servers 10A, 10B may be, for example, a blade server, rack server, or any other type of network device and may be configured to host one or more virtual machines (VMs) (not shown). The virtual machines share hardware resources without interfering with each other, thus enabling multiple operating systems and applications to execute at the same time on a single computer. The virtual machines may be moved between servers, across layer 2 or layer 3 boundaries, based on traffic patterns, hardware resources, or other criteria. The term 'host' or 'endpoint' as used herein may refer to a physical machine (e.g., server) or virtual machine operating on the physical machine.

The host 10A, 10B may be identified by both a layer 3 (IP) address and a layer 2 (MAC) address. In first embodiment, a distributed database is used to store L3 and L2 host addresses. The database includes a mapping of the host L3 address to the host L2 address and a location identifier (e.g., address of the edge device associated with the host). The distributed database comprises a plurality of database nodes. In the example shown in FIG. 1, each edge device 18A, 18B has an associated database node 32A, 32B, respectively. Database node A holds the detailed state of MAC and IP addresses and their locators for site A. Similarly, database node B holds the detailed state of MAC and IP addresses and their locators for site B. This information is maintained at mapping table 34 in FIG. 1 (described below with respect to FIG. 3B). The mapping tables 34 may be distributed across any number of nodes.

The database node 32A, 32B may be, for example, a server, switch, router, or any other network device. The database nodes 32A, 32B are accessible from the core network 14 (e.g., located within the core network or located remotely and in communication therewith). The database nodes 32A, 32B are also in communication with one another (e.g., direct communication or in communication via any number of nodes or networks).

The database may also include information stored at the edge devices, which would be leaves of the database tree. For example, the database nodes 32A, 32B may contain host layer 3 addresses mapped to location identifiers, with the MAC addresses stored at the edge devices. In this example the database is distributed over the database nodes and edge devices.

It is to be understood that the network shown in FIG. 1 and described above is only an example and that the embodiments may be implemented in networks having different network topologies and network devices, without departing from the scope of the embodiments.

Figure 2:
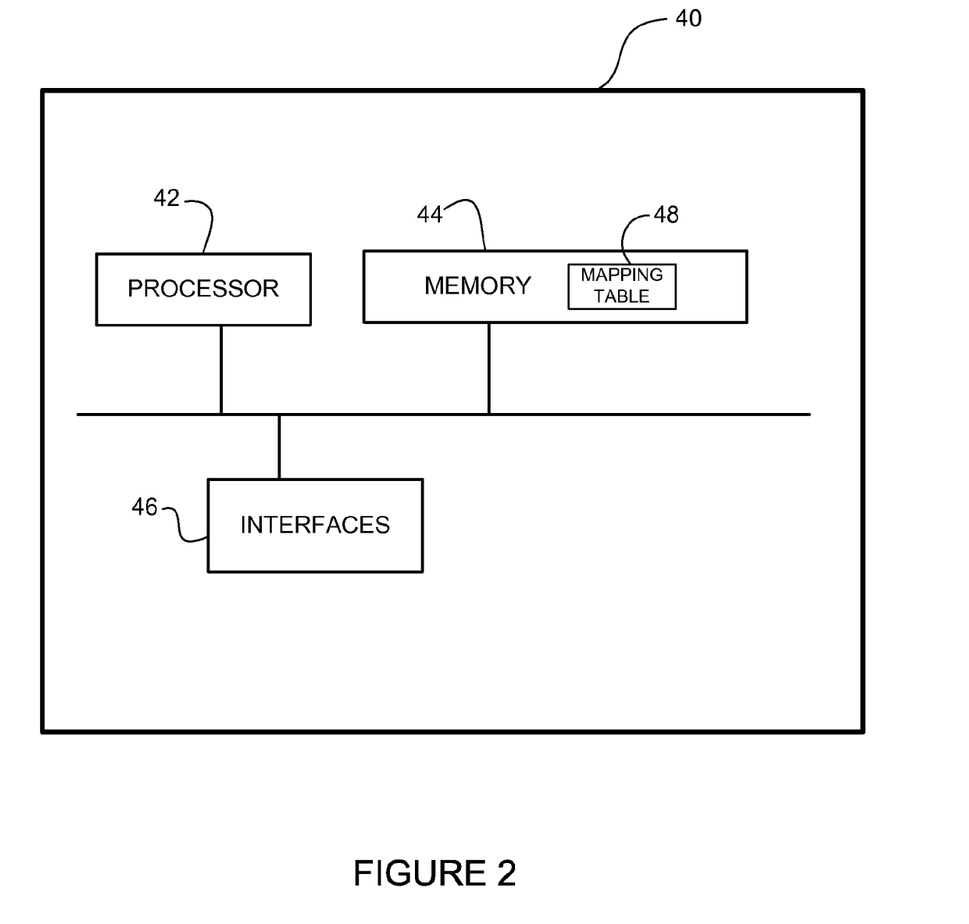
FIG. 2 depicts an example of a network device useful in implementing embodiments described herein.

FIG. 2 illustrates an example of a network device 40 (e.g., edge device 18A, 18B, database node 32A, 32B in FIG. 1) that may be used to implement the embodiments described herein. In one embodiment, the network device 40 is a programmable machine that may be implemented in hardware, software, or any combination thereof. The network device 40 includes one or more processor 42, memory 44, and network interfaces 46.

Memory 44 may be a volatile memory or non-volatile storage, which stores various applications, operating systems, modules, and data for execution and use by the processor 42. For example, memory 44 may include mapping table 48 (e.g., mapping table 30 at edge device 18A, 18B or mapping table 34 at database node 32A, 32B).

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 46 may comprise any number of interfaces (linecards, ports) for receiving data or transmitting data to other devices. The network interface 46 may include, for example, an Ethernet interface for connection to a computer or network.

It is to be understood that the network device 40 shown in FIG. 2 and described above is only an example and that different configurations of network devices may be used. For example, the network device 40 may further include any suitable combination of hardware, software, algorithms, processors, devices, components, or elements operable to facilitate the capabilities described herein.

Scalable Layer 2 Overlay Services

Referring again to the network shown in FIG. 1, a network overlay (overlay network 15) is defined by a series of edge devices (Virtualization Tunnel End Points—VTEPs) 18A, 18B that are interconnected to each other by a backbone network underlay (core network 14) and that map two address spaces to each other; the endpoint address space and the backbone address space. Based on the direction of traffic flow, edge devices 18A, 18B play a role as either encapsulating or decapsulating devices. When the edge device encapsulates, it maps the endpoint destination address of the received traffic to a location address in the backbone network, which identifies a decapsulating edge device. With knowledge of this mapping, the edge device 18A, 18B adds a header to the traffic that is used to encapsulate the traffic and forward it to the location of the destination (the decapsulating edge device) across the backbone network 14.

A layer 2 overlay maps the L2 addresses of the endpoints (in an Ethernet network these would be MAC addresses) to the addresses identifying the different locations across the backbone where an endpoint may reside. The location addresses may be IP addresses in an IP backbone, or may be defined by Label Switched Paths (LSPs) and Label Switching Routers (LSRs) in an MPLS network, or otherwise defined in other types of backbones.

In an L2 overlay, a database is used to maintain a mapping of the L2 endpoint addresses to the backbone location addresses. This database is a flat structure that cannot be aggregated or summarized due to the nature of the L2 address family (in an Ethernet network this is the MAC address family), and thus impacts scalability.

As noted above, network endpoints may be identified by both an L3 (IP) address and an L2 (MAC) address. Aggregability can be brought to an L2 overlay service if both the L3 and L2 endpoint addresses are included in a database containing the mappings between endpoints and locations. The inclusion of the L3 endpoint addresses allows the database to be structured in such a way that it can enjoy the benefits of aggregability and therefore allow distribution of state in an ordered hierarchy. As described below, the L3 information is used to navigate the database 34 and its ordered hierarchy and minimize (summarize) the information that is shared across nodes of the distributed database. Only L3 endpoint information is summarized and shared across database nodes 32A, 32B. The L2 endpoint information is maintained within the leaf nodes of the database and not published to any other database nodes. Thus, only information that can be aggregated and summarized is shared across database nodes. Non-summarizable L2 information is kept local to each database node and therefore distributed and scalable.

The first embodiment allows for an L2 overlay service that uses an L3 based control plane by relaying the lookup of an L2 destination to an L3 key in an L3 database (mapping table 34). The result of the lookup is the location of the L2 destination endpoint. The encapsulating device (edge device 18A, 18B) uses the location obtained to encapsulate the L2 frames in a location header and provide the necessary L2 overlay service. There are no changes required to the data path or to the network model provided by the overlay. The edge devices (VTEPs) 18A, 18B continue to switch traffic generated by the endpoints 10A, 10B.

In one embodiment, the system uses a demand based information request model. An example of such a demand based information model is the DNS (Domain Name System), in which mappings are requested when necessary (and cached after being requested). The scalability applies as well to "Push" based network databases (such as BGP (Border Gateway Protocol) or ISIS (Intermediate System-to-Intermediate System)), by enabling summarization of the address space.

Figure 3A:
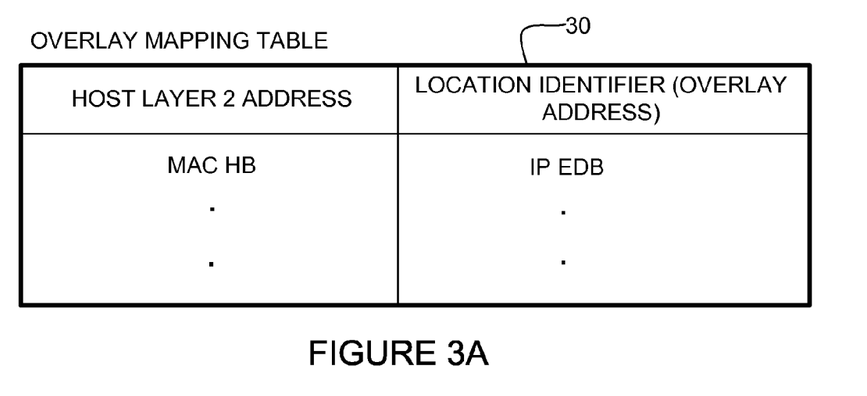
FIG. 3A illustrates an example of an overlay mapping table maintained at an edge device in the network of FIG. 1.
Figure 3B:
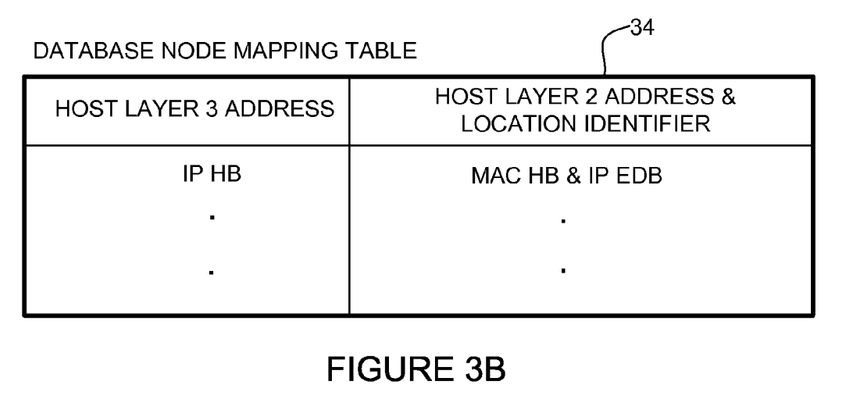
FIG. 3B illustrates an example of a mapping table maintained at a database node in the network of FIG. 1.

FIGS. 3A and 3B illustrate examples of mapping tables at the edge devices 18A, 18B and database nodes 32A, 32B, respectively. It is to be understood that these tables are only examples and that other formats, data, or data structures may be used without departing from the scope of the embodiments.

The overlay mapping table 30 shown in FIG. 3A is maintained at the edge device. The first column includes layer 2 addresses for remote hosts. The second column includes the corresponding overlay network address. The overlay network address is a backbone location address (referred to herein as a location identifier). As described above, the location addresses may be an IP address or may be defined by Label Switched Paths (LSPs) and Label Switching Routers (LSRs) in an MPLS network, or otherwise defined in other types of backbones. In the example shown in FIG. 3A, the overlay network address is the IP address of the remote edge device located in the same network site as the remote host.

The host L2 address is used as a key to search the table 30. The table provides information used by the edge device in forwarding packets received at its interfaces. The first entry in the example shown in FIG. 3A includes the layer 2 (MAC) address for host 10B (MAC HB) and the corresponding IP address for edge device 18B (IP EDB). Based on a lookup in table 30, a packet received at edge device 18A and destined for host 10B (MAC HB) is encapsulated in an IP packet with an IP header having a destination address of edge device 18B (IP EDB). The packet is transmitted over the core network 14 to edge device 18B. A packet received at edge device 18B and destined for host 10B is stripped of its overlay IP header and forwarded to host 10B. Entries may be stored in the table 30 when the database node 32A, 32B responds to a mapping request.

FIG. 3B illustrates an example of mapping table 34 stored at the database nodes of the distributed database. The first column includes the host (endpoint) L3 address. In one example, the layer 3 host address is an IP address referred to as an endpoint identifier (EID). The second column includes the host layer 2 address and the backbone location address (location identifier). The entry shown in the example of FIG. 3B includes the IP address of host 10B (IP HB) mapped to the layer 2 address of host 10B (MAC HB) and the IP address of edge device 18B (IP EDB). The host MAC address and edge device address in the second column may be referred to as a locator. The IP host address is used as lookup key in the table.

As described above with respect to FIGS. 3A and 3B, the control plane uses layer 3 (IP) addresses for hosts and the data plane uses layer 2 (MAC) addresses for lookup. Use of layer 3 addresses in the control plane provides scalability and potential address aggregation, as previously discussed.

Figure 4:
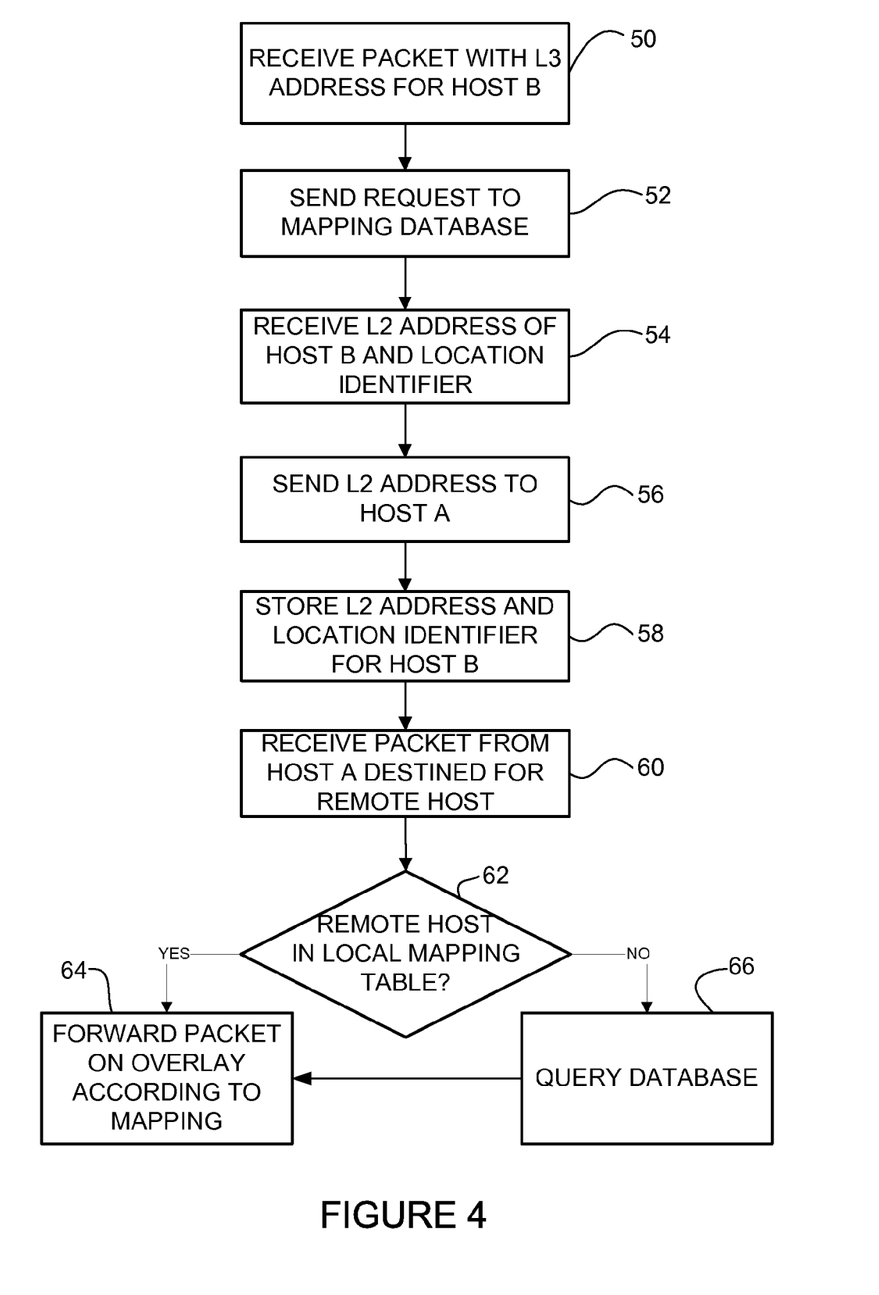
FIG. 4 is a flowchart illustrating a process for providing a scalable layer 2 overlay service, in accordance with one embodiment.

FIG. 4 is a flowchart illustrating a process performed at an edge device for providing scalable layer 2 overlay services with a layer 3 control plane, in accordance with one embodiment.

At step 50 a first edge device 18A receives from a first host 10A, a packet comprising a layer 3 address for a second host 10B. This packet may be, for example, a control packet (e.g., ARP (Address Resolution Protocol) request) or a data packet (e.g., packet destined for host 10B with destination address in IP header). The edge device 18A does not have the layer 2 address for host 10B (cache miss). The edge device 18A uses the layer 3 address of the host 10B to receive a layer 2 address and location identifier for the host 10B from the distributed database (steps 52 and 54). As described above, the distributed database is accessible from the core network 14 and comprises a mapping of layer 3 host addresses to layer 2 host addresses and location identifiers. Upon receiving a response from the distributed database, the edge device 18A sends the layer 2 address of host 10B to host 10A (step 56). The edge device 18A also stores the L2 address of host 10B and location identifier (step 58). The edge device may store the host IP address to edge device IP address (location identifier) mapping in a map cache control plane entry and program hardware with the host MAC address to edge device IP address mapping in a data plane entry, for example. If the packet received at step 50 is a data packet, the packet may be stored and forwarded after the lookup (steps 52-54).

When the edge device 18A receives a packet destined for a remote host (i.e., data packet destined for host B or another remote host), it uses the MAC (L2) address of the destination to lookup the corresponding overlay network address (location identifier) in its local mapping table 30 (steps 60 and 62). If the MAC address is in the table, the packet is forwarded on the overlay according to the mapping (step 64). If the MAC address of the destination is not found in the local mapping table 30, the edge device queries the database node, as previously described (step 66). Once it receives the mapping information, it forwards the packet on the overlay network according to the layer 2 host address to location identifier (e.g., edge device address) mapping (step 64).

It is to be understood that the process shown in FIG. 4 and described above is only an example and that steps may be added, removed, modified, or reordered without departing from the scope of the embodiments. For example, the edge device may receive the host L2 address in response to a first request sent to the distributed database (e.g., step 52) and the location identifier in response to a second query (e.g., step 66).

It should be noted that ARP is only one example of a control packet and that other protocols may be used, including IPv6 node discovery or any other host resolution protocol that may be associated with IPv4, IPv6, or any other address format.

The following provides an example of the process shown in FIG. 4, in accordance with one embodiment. In this example, hosts A and B communicate over core network 14 (as shown in FIG. 1). Host A is located in network site A and is connected to the overlay network 15 via edge device A. Host B is in network site B and is connected to the overlay via edge device B. Database node A and database node B are nodes of the distributed database.

Host A has the following addresses:
IP: IPHA
MAC: MHA

Host B has the following addresses:
IP: IPHB
MAC: MHB

Edge device A and edge device B have backbone facing addresses IPEDA and IPEDB, respectively. The edge devices can reach each other over the backbone and provide an L2 overlay service between sites A and B. Hosts A and B are on the same subnet.

Database node A is authoritative for site A and database node B is authoritative for site B. An authoritative database node holds the detailed state of MAC and IP addresses (and their location identifiers) for the site for which it is authoritative. Nodes only hold summary information for addresses of other sites and a pointer to which node to consult in order to get details of addresses within those summary prefixes. For example, database node A will have a summary route to the prefix containing IPHB.

The following describes steps taken when host A wants to send a packet to host B:
1) Host A (IPHA) sends an ARP (Address Resolution Protocol) request for host B (IPHB).
2) Edge device A intercepts the ARP request and consults the mapping database at the database nodes about IPHB.
2.1) In order to consult the database, edge device A sends a request for resolution of IPHB to database node A.
2.2) Database node A does not have the detailed information for IPHB, but it does know that database node B is authoritative for the prefix containing IPHB, so database node A forwards the request to database node B.
2.3) Database node B has the complete information for IPHB including its MAC address (MHB) and its location (IPEDB).
2.4) Database node B replies to the request from edge device 18A with the requested information.
3) Edge device A learns from the database reply that host B (IPHB) has a MAC address of MHB.
4) Edge device A replies to the ARP request (from step (1)) on behalf of IPHB. Edge device A replies with MAC address MHB.
5) Host A caches the ARP reply and starts sending traffic to MHB.
6) Edge device A receives a packet destined to MHB and initiates a lookup in its mapping table for MHB.
6.1) Edge device A is in promiscuous mode (acting as a L2 switch) so that it receives packets that are addressed to a MAC address other than its own. Edge device A gets the traffic destined for host B (MHB) either because MHB is unknown (and flooded) or because MHB has previously been learned as sourced from the overlay (and therefore edge device A).
7) The lookup for host B's location is done using MHB as a key to search a local map cache (mapping table 30) at edge device A. If a match is found, traffic is forwarded according to the mapping found.
8) If a match is not found in the map cache, IPHB is used as a key to send a query to the database. IPHB is known as it is part of the L3 header in the packet. Steps (2.1)-(2.4) take place at this point.
9) Edge device A receives a response from the database and caches the mapping of endpoint MHB to location IPEDB. It should be noted that this step could have been done at step (2) at the same time of requesting the host MAC address.
10) Subsequent frames destined to MHB will match the entry in the local mapping table and will be encapsulated and forwarded to IPEDB without having to repeat the lookup in the database.

In another example, the database nodes A and B contain host layer 3 addresses mapped to location identifiers, and the host layer 2 addresses are stored at the edge devices. In this example, steps 2-2.4 from above are replaced with the following steps:

2) Edge device A intercepts the ARP request and consults the mapping database at the database nodes about IPHB.

2.1) In order to consult the database, edge device A sends a request for resolution of IPHB to database node A.

2.2) Database node A does not have the detailed information for IPHB, but it does know that database node B is authoritative for the prefix containing IPHB, so database node A forwards the request to database node B.

2.3) Database node B has location information for IPHB. IPEDB (the edge device or location for IPHB) is authoritative for IPHB. Database node B forwards the request to IPEDB.

2.4) IPEDB has the complete information for IPHB including its MAC address (MHB) and its location (IPEDB).

2.5) IPEDB replies to the request from edge device 18A with the requested information.

As described above, the first embodiment allows for use of a layer 3 control plane to provide a scalable layer 2 overlay service through the use of a distributed database that contains both the layer 2 and layer 3 addresses of hosts.

Consolidation of Data Plane Encapsulation in Layer 2 and Layer 3 Overlays

The following describes data plane encapsulation that can be used to deliver both L2 and L3 overlay services. In the L3 overlay case, the fields used for the L2 inner header are preserved, but ignored during the forwarding process. This allows for the use of common hardware and standard encapsulations to deliver L2 and L3 overlay services.

Encapsulations for L2 overlays may be structured as follows:

<IP-Outer-Header><Overlay-shim><L2-inner-Header><Payload>

In an L2 overlay, the L2 inner header contains important information regarding the source and destination of the endpoints that are communicating over the overlay.

The equivalent encapsulation for an L3 overlay would not include the L2 inner header but simply have an IP inner header that contains the important information on source and destination addresses for the communicating endpoints as follows:

<IP-Outer-Header><Overlay-shim><IP-Inner-Header><Payload>

This last header format may be supported in hardware platforms, but the more popular format will be the L2 overlay data plane format.

Figure 5:
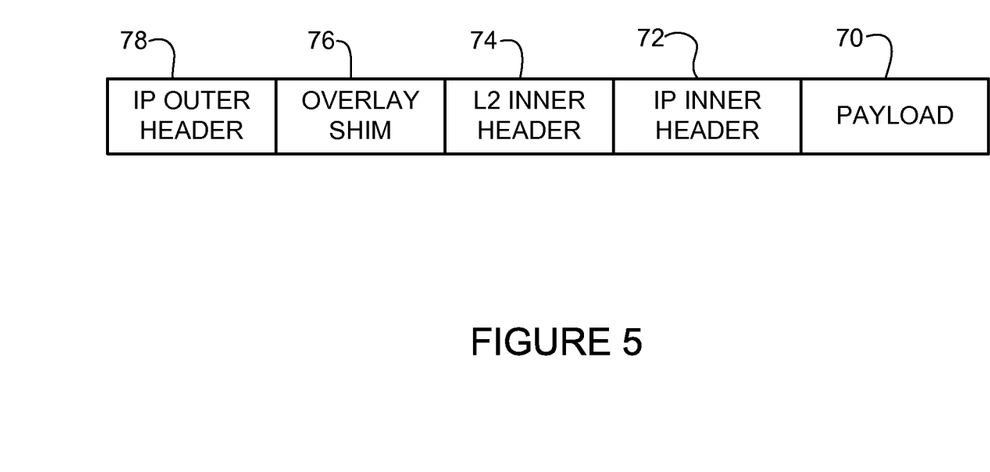
FIG. 5 illustrates a data plane encapsulation format for use in layer 2 and layer 3 overlay services, in accordance with one embodiment.

The second embodiment may be used to implement an L3 overlay by using an L2 overlay data plane format as shown in FIG. 5. The packet includes a payload field 70, IP inner header 72, L2 inner header 74, overlay shim (overlay field that identifies the type of transport) 76, and IP outer header 78. This header format allows hardware to support L2 and L3 overlays with a common encapsulation. When using this format for an L2 overlay, the IP inner header 72 may or may not be included depending on the nature of the payload traffic (not an IP packet).

When the edge device 18A, 18B receives a packet from the host 10A, 10B, the edge device adds the overlay shim 76 and IP outer header 78, and transmits the packet while retaining the L2 inner header 74 and IP inner header 72.

The L2 encapsulation format is used as the data plane of L3 overlays. In the L3 overlay case, the L2 inner header 74 is still included, but the important information regarding flow source and destination is actually in the IP inner header 72.

Since L3 overlays are based on the principle of routing, which implies a rewrite of the source/destination MAC addresses at every IP hop, the contents of the L2 inner header 74 become irrelevant to the forwarding operation. The fields are kept in place solely for the purpose of consistency between the data planes of either service (L2 or L3) and in order to use hardware data planes designed for L2 and provide an L3 service.

The control plane mechanisms by which an L2 or L3 overlay service is provided would be orthogonal to the use of this data plane variation and therefore remain unaffected.

Since the L2 inner header information is not relevant to the forwarding (and would have to be rewritten for final delivery anyway), the bits in the L2 inner header field 74 can be set to a dummy value and ignored or optionally repurposed. In one embodiment, the source and destination addresses (SA, DA) in the L2 inner header 74 are set to zero (0000.0000.0000) to indicate "non-use" and can use non-zero bits for future use cases. An IEEE 802.1Q field may optionally be included as part of the L2 inner header 74, and it is also irrelevant when providing an L3 service and could be zeroed out or optionally repurposed. The Ethertype field in this L2 inner header 74 indicates the nature of the payload 70 that follows (an IP header in the case of an L3 service, data in the case of an L2 service).

It should also be noted that, by virtue of aggregation and summarization of L3 addresses, an implementation of a virtual tunnel end point can do a much more effective use of the local mapping cache that maps virtualized (L3) addresses on the underlying network.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving a packet from a first host at a first edge device, the packet comprising a layer 3 address of a second host in communication with a second edge device, said first edge device in communication with said second edge device in an overlay network defined by said edge devices interconnected by a core network;
    using said layer 3 address of said second host at said first edge device to receive a layer 2 address and a location identifier for said second host from a remote distributed database accessible from the core network, the database comprising a mapping of layer 3 host addresses to layer 2 host addresses and location identifiers;
    storing a mapping of said layer 2 address to said location identifier at said first edge device for use in forwarding packets to said second host; and
    transmitting from said first edge device, said layer 2 address of said second host to said first host for use by said first host in transmitting traffic to said second host.

2. The method of claim 1 wherein the location identifier comprises an address of said second edge device.

3. The method of claim 1 wherein said packet comprises a control packet.

4. The method of claim 1 wherein using said layer 3 address to receive said layer 2 address and said location identifier comprises transmitting a request containing said layer 3 address from said first edge device to the database.

5. The method of claim 4 wherein transmitting said request comprises transmitting separate requests for said layer 2 address and said location identifier.

6. The method of claim 1 wherein a mapping of said layer 3 host address to said location identifier is stored in a control plane entry.

7. The method of claim 1 further comprising encapsulating traffic received from said first host with said location identifier and decapsulating traffic received from said second edge device.

8. The method of claim 1 wherein the remote distributed database comprising a plurality of database nodes.

9. An apparatus comprising:
    memory for storing a database comprising a plurality of entries each comprising a layer 3 address mapped to a layer 2 address and a location identifier, the database part of a distributed database operable to receive requests from remote edge devices;
    a processor for receiving said layer 3 address for a host and searching the database for a layer 2 address and location identifier for the host, transmitting said layer 2 address and said location identifier to an edge device located in an overlay network defined by a plurality of edge devices interconnected by a core network; and
    an interface for communication with the core network;
    wherein said layer 3 address is used in a control plane to search the database, and a mapping of said layer 2 address to said location identifier is used to forward traffic in a data plane.

10. The apparatus of claim 9 wherein the distributed database comprises summarized layer 3 information shared across a plurality of database nodes.

11. The apparatus of claim 10 wherein said processor is configured to identify a prefix for said layer 3 address and request said layer 2 address and said location identifier from one of the database nodes.

12. The apparatus of claim 10 wherein each of the database nodes is associated with one of the edge devices.

13. The apparatus of claim 9 wherein the location identifier comprises an address of one of the edge devices.

14. The apparatus of claim 9 wherein said layer 3 address is received in a request from the edge device.

15. The apparatus of claim 9 wherein the processor is configured to transmit said layer 2 address and said location identifier in separate messages to the edge device.

16. Logic encoded on one or more non-transitory computer readable media for execution and when executed operable to:
    receive a packet comprising a layer 3 header containing information for source and destination endpoints;
    insert an overlay field that identifies a type of transport and a layer 3 outer header into the packet at an edge device, wherein a layer 2 inner header and IP (Internet Protocol) inner header are retained in the packet; and
    transmit the packet from the edge device on a layer 3 overlay defined by a plurality of edge devices interconnected by a core network;
    wherein the packet transmitted from the edge device includes a layer 2 inner header to allow hardware to support layer 2 and layer 3 overlay networks with a common encapsulation and wherein contents of a layer 2 inner header are not used in forwarding operations for a layer 3 overlay network.

17. The logic of claim 16 wherein the outer layer 3 header comprises source and destination information used in forwarding the packet.

18. The logic of claim 16 wherein source and destination information in the layer 2 header are set to a value indicating non-use of the contents.

19. The logic of claim 16 wherein the packet is configured to be transmitted in a hardware data plane configured for layer 2 overlay services.

20. The method of claim 1 further comprising determining that a local database at said first edge device does not contain said layer 2 address before using said layer 3 address to receive said layer 2 address from the remote distributed database.

* * * * *